United States Patent [19]

Berry et al.

[11] Patent Number: 5,117,460
[45] Date of Patent: * May 26, 1992

[54] VOICE CONTROLLED PAGER AND PROGRAMMING TECHNIQUES THEREFOR

[75] Inventors: Thomas G. Berry, Schaumburg, Ill.; Paul F. Smith; Kamyar Rohani, both of No. Richland Hills, Tex.; Winfield J. Brown, Jr., Lantana; Philip P. Macnak, West Palm Beach, both of Fla.

[73] Assignee: Motorola, Inc., Schaumburg, Ill.

[*] Notice: The portion of the term of this patent subsequent to Sep. 17, 2008 has been disclaimed.

[21] Appl. No.: 646,484

[22] Filed: Jan. 25, 1991

Related U.S. Application Data

[63] Continuation of Ser. No. 213,656, Jun. 30, 1988, abandoned.

[51] Int. Cl.⁵ .............................. G10L 5/00
[52] U.S. Cl. ...................................... 381/41
[58] Field of Search ........................ 381/41-46, 381/110; 364/513.5; 379/56-60; 367/198

[56] References Cited

U.S. PATENT DOCUMENTS

| | | | |
|---|---|---|---|
| 4,233,685 | 11/1980 | Taylor | 455/151 |
| 4,422,071 | 12/1983 | DeGraaf | 340/825.44 |
| 4,462,080 | 7/1984 | Johnstone et al. | 364/513.5 |
| 4,525,793 | 6/1985 | Stackhouse | 381/36 |
| 4,525,865 | 7/1985 | Mears | 455/186 |
| 4,593,155 | 6/1986 | Hawkins | 179/2 EA |
| 4,720,802 | 1/1988 | Damoulakis et al. | 364/513.5 |
| 4,731,811 | 3/1988 | Dubus | 379/58 |
| 4,737,976 | 4/1988 | Borth et al. | 381/46 |
| 4,776,016 | 10/1988 | Hansen | 364/513.5 |
| 4,797,924 | 1/1989 | Schnars et al. | 381/43 |
| 4,797,929 | 1/1989 | Gerson et al. | 381/43 |
| 4,984,295 | 1/1991 | Engstrom et al. | 455/186 |
| 5,040,212 | 8/1991 | Bethards | 381/41 |

FOREIGN PATENT DOCUMENTS

| | | |
|---|---|---|
| 2016768 A | 9/1979 | European Pat. Off. |
| 0041195 | 12/1981 | European Pat. Off. |

*Primary Examiner*—Emanuel S. Kemeny
*Assistant Examiner*—Michelle Doerrler
*Attorney, Agent, or Firm*—Thomas G. Berry; Vincent B. Ingrassia; William E. Koch

[57] ABSTRACT

An individual desiring to operate a pager via voice commands sends a message to a repository of voice recognition codebooks requesting access to a particular codebook. The repository device(s) respond by transmitting the codebook of that individual to at least one pager, which stores the codebook therein. In a second embodiment, each individual operating a pager by voice commands is provided with a codebook module, which contains suitable memory storage having at least that operator's codebook stored therein. By inserting the codebook module (or card) into the pager, that pager becomes at least partially controllable by the voice commands of that operator. The codebook module may be easily removed to permit the communication device to be rapidly reprogrammed by inserting the codebook of another operator.

28 Claims, 2 Drawing Sheets

VOICE CONTROLLED PAGER AND PROGRAMMING TECHNIQUES THEREFOR

This is a continuation of application Ser. No. 07/213,656, filed Jun. 30, 1988 now abandoned.

TECHNICAL FIELD

This invention relates generally to voice recognition, and more particularly to speaker dependent voice recognition applied to paging communication systems, and is more specifically directed toward a method for programming pagers to recognize and respond to vice commands.

BACKGROUND ART

Subscribers to paging communication services continually demand increasingly powerful and sophisticated features. However, this demand conflicts with an equally important requirements of minimized size and increased battery life. Contemporary state-of-the-art pagers are designed so as to minimize their physical size. Therefore, it becomes difficult to incorporate advanced features into contemporary pagers since these feature typically require control or activation by the subscriber, and the size of the pager renders the addition of control switches or keypads impractical.

Voice recognition technology has been recognized as an advantageous feature for many product applications. Such technology may be employed to render a product partially or entirely controllable by voice commands in situations where hands-on control is impossible or impracticable. Speaker dependent voice recognition devices are designed to respond to a particular individual. Stored within such devices are speaker specific parameters, such as, for example, variations in the vocal tract response, pitch period, short-term speech power, and amplitude of the short-term speech spectra.

When applied to paging communication systems, voice recognition raises several concerns. One such concern involves the problem of storing the voice recognition information (commonly referred to as a "codebook") in the pager. Presently, pagers are typically provided with subscriber specific information, such as, for example, an identification code. However, this type of information may be readily generated and stored within the pager. Thus, if a pager should fail, a service company may easily supply the subscriber with a replacement pager. However, the generation and transference of a voice recognition codebook may not be as fundamental as identification code transfer.

In some circumstances, it may be desirable to enable a single pager to respond to the voice commands of more than one individual (subscriber). A typical situation may be in a company setting wherein a pager is temporarily provided to an individual that must be available to respond to some emergency or important situation. In another situation, a single pager may be shared between, for example, maintenance personnel operating in working shifts (i.e., three eight-hour shifts). Therefore, to provide voice control, the codebook for each individual must be stored within the pager. However, mass codebook storage may significantly increase the cost of the pagers. Additionally, codebook maintenance costs would be significant since the pagers must be updated with each change in personnel. Moreover, the addition of several memory devices, or a memory printed circuit board, may increase the size of the pager beyond that desired by the consuming public. This is a particular concern of paging subscribers. An alternative may be to use speaker independent technology, however, speaker independent devices are typically more complex, less accurate, and require more batter energy.

One solution may be to store the codebooks of only a few individuals thereby reducing the amount of required memory. However, this approach is inflexible to changing circumstances such as variations in personnel working hours or in the event that the pager itself should fail. Another approach may be to have each pager contain only enough memory for a single codebook, which must be retrained for each subscriber. Speaker dependent voice recognition devices must be "trained" to respond to each individual. Training is accomplished by having an individual repeat control words several times until the device has been "trained" to recognize that word as spoken by that individual. However, training is a time consuming process and the addition cf circuitry to provide training capabilities in each pager may adversely impact pager cost and size. Accordingly, a need exists in the art to permit pagers to be programmed to respond to the voice commands of subscribers in an efficient and organized manner.

SUMMARY OF THE INVENTION

Briefly, according to a first embodiment of the invention, an individual desiring to operate a pager via voice commands sends a message to a repository of voice recognition codebooks requesting access to a particular codebook. The repository device(s) respond by transmitting the codebook of that individual to at least one pager, which stores the codebook therein. Thereafter, the pager may respond to the voice commands of that individual. In this way, pagers may be rapidly reprogrammed.

According to a second embodiment of the invention, each individual operating a pager within a paging communication system is provided with a codebook module (or card), which contains a suitable memory means having at least that subscriber's codebook stored therein. By inserting the codebook module (or card) into the pager, that pager becomes at least partially controllable by the voice commands of that subscriber. The codebook module may be easily removed to permit the communication device to be rapidly reprogrammed by inserting the codebook of another subscriber. Further, the codebook module may also operate as a "key", which "locks" the pager upon removal of the codebook module thereby prohibiting unauthorized operation.

DETAILED DESCRIPTION OF A PREFERRED EMBODIMENT

Figure 1:
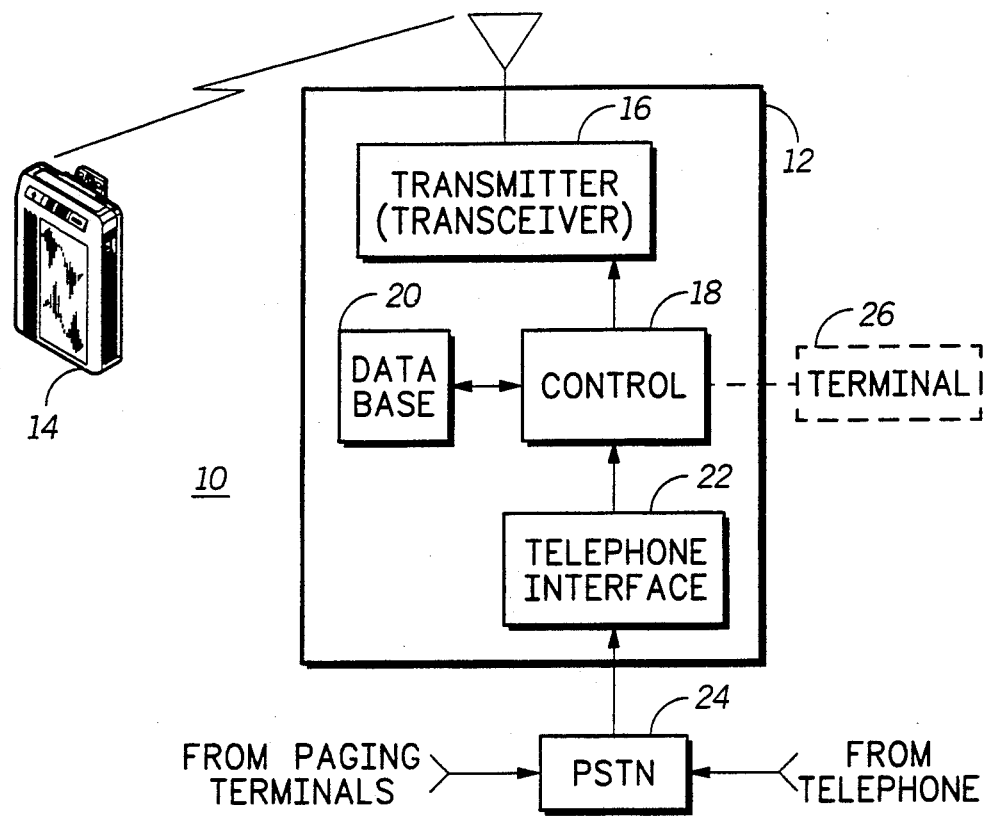
FIG. 1 is an illustration of paging system incorporating the first embodiment of the present invention.

Referring now to FIG. 1, there is shown an illustration of a paging communication system (10) incorporating the invention. The paging communication (10) as shown comprises at least a central repository station (12), which may communicate with a plurality of pagers (subscriber units) (14). As used herein a pager or subscriber unit comprises a personal, portable device, which is typically designed to be carried on or about the person, and the term subscriber refers to any individual using or operating a pager or subscriber unit.

Typically, the repository station (12) comprises a transmitter (or transceiver for acknowledge-back pagers) (16), which is coupled to a paging controller (18). The paging controller (18) includes appropriate address encoders and decoders, memory, processing equipment, real-time clocks and other associated functions well known in the paging arts. Additionally, the paging controller (18) may access a data base (20) of voice recognition information (codebooks), which the controller may route to the transmitter (16) for transmission to at least one pager (14). The repository station (12) also includes an interface (22) through which communication with the outside world is received from paging terminals and telephones via a conventional public switched telephone networks (PSTN) (24). As is known in the art, paging terminals comprise input devices through which messages and pager addresses are communicated to the paging controller (18). Preferably, the paging controllers comprises video terminals having alphanumeric keypads (or equivalent) to permit message entry. Optionally, one or more paging terminals (26) may be directly coupled to the controller (18).

The operation of the system (10) shown in FIG. 1 is such that the pagers (14) are capable of receiving messages in any of several message formats or signalling patterns. These message formats include, but are not limited to, the Golay Sequential Code (GSC), and the British Post Office Paging System Format (POCSAG). While just two message formats have been mentioned, the present invention contemplates the use of any suitable message format or signalling.

According to a first embodiment of the invention, all required codebooks for all personnel using the paging system (10) are centrally contained in the repository (12). The central repository is preferably associated with a facility that may be used to provide "training" of the subscriber units. In this way, new paging subscribers may create a personal codebook by training a pager (or its simulated equivalent) at the central facility The centralized repository storage of the codebooks facilitates maintenance of the codebook library. Alternately, the repository may be distributed among several locations within a given geographic area. However, this approach may require tighter controls and coordination to adequately maintain the codebook libraries.

Each of the pagers (14) contain enough codebook memory to store the codebook for at least one individual. Thus, before an individual may use the pager, his or her codebook must be transferred (down-loaded) from the central repository (12) to the pager (14). Preferably, an individual desiring to operate a pager (14) may transmit a message to the central repository (12) identifying and requesting a particular codebook from the codebook library. The present invention contemplates several alternatives to generating the codebook request message. As a first method for generating a codebook request, an identification code may be entered on a keypad (or equivalent) of a paging terminal (26) and transmitted to the central repository (12). Alternately, programming a pager (14) with a codebook may be accomplished by contacting the paging controller (18) via the PSTN (24) using any conventional telephone In this way, a codebook identification code may be transmitted, such as, for example, by using the DTMF telephone tones, which may respond by down-loading a particular codebook to a particular pager (14). In a further embodiment, the paging controller (18) may employ a limited version of speaker independent voice recognition technology, which may be used to generate the codebook down-load request. Finally, if the pager (14) contains a transmitter to enable the acknowledgment of messages, a codebook down-load request may be generated by transmitting an acknowledge code from the pager to the paging transceiver. Upon receipt of an unsolicited acknowledge code (i.e., an acknowledge code for which no message was previously sent) the paging transceiver may transmit a codebook to the requesting pager.

Once the codebook has been stored in the pager (14), the subscriber may partially (or entirely) control the operation of the pager by voice commands. Alternately, voice commands may be used in conjunction with manually entered commands (or vice versa) to execute a desired function. Whenever another individual desires to use that pager (for example, at a change in a working shift), the codebook for the new subscriber may be rapidly down-loaded as described above. Optionally, the memory in the subscriber may be expanded (within size and cost constraints) to retain a limited number of the last used codebooks in a first-in-last-out manner. For example, the codebook of the current user and the prior two subscribers may be retained in the subscriber unit. In this way, if the same three individuals operating the subscriber during the three operating shifts were ordinarily repeated day to day, no reprogramming of the subscriber unit would be required.

In another aspect of this first embodiment, the present invention contemplates that the central repository (12) may contain a data base of the subscribers and the associated pagers that they customarily operate. At each shift change, the central repository (12) may automatically down-load the codebook for the next subscriber based upon time of day (or other suitable parameters). If a change in personnel occurs, due to illness or unavailability, a supervisor may enter a new name into the roster (data base), and that individual's codebook may be automatically down-loaded to the subscriber unit. This approach has the advantage of minimizing the over-the-air requests for new codebooks to those situations where a subscriber change occurs unexpectedly.

Figure 2:
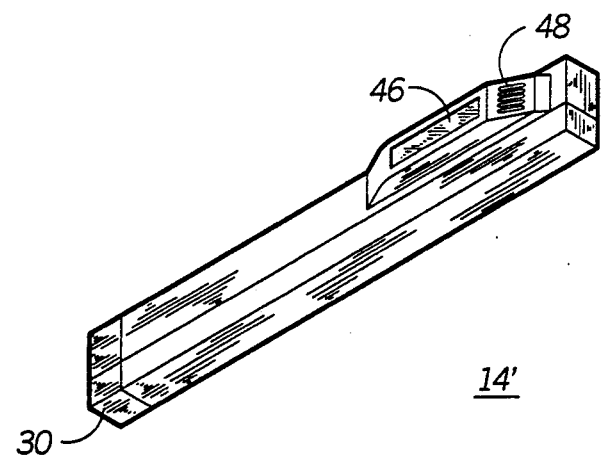
FIG. 2 is an illustration of a pager incorporating the second embodiment of the present invention.

Referring now to FIG. 2, there is shown a pager (14') having a codebook module (30) removably coupled thereto. The pager (14') is of the shirt-pocket variety having a display area (46) integrated into the holding or retaining clip, and a microphone (48) for receiving voice commands. As can be seen, the pager (14') does not have any of the controls (buttons or switches) commonly used with contemporary pagers. Alternatively, some buttons may be included if only partial voice control is implemented.

According to this second embodiment of the invention, each individual authorized to operate a pager within the paging system (10) is provided with a codebook module (or card depending upon the size of the pager), that may be removably coupled to the pager. Each codebook module is preferably created at a facility that may be used to provide "training" of a pager (or its simulated equivalent). In this way, the burden of re-training each pager is avoided, since each subscriber carries their codebook with them.

Each of the codebook modules (or cards) contain enough memory to store at least the codebook for one individual An example of a memory storage card suitable for use as a codebook card comprises a DS1217 manufactured by Dallas Semiconductor, or its functional equivalent. Additionally, the codebook module may contain the subscriber's identification code, access priority code, group affiliation code, or other codes permitting the subscriber access to advanced system features.

Referring still to FIG. 2, before an subscriber may use the pager (14'), his or her codebook module (30) must be inserted into any suitable receptacle in the pager. Optionally, the codebook module may also be used as a "key" to the pager, so that no unauthorized individual could receive messages which may be proprietary in nature without a codebook module. Even if an unauthorized person were able to appropriate an subscriber's codebook module, the pager would not fully function since the pager would not respond to any voice commands other that the authorized subscriber (due to the speaker dependency of the preferred voice recognition technology).

After the codebook card has been inserted into the subscriber unit (10), the subscriber may partially (or entirely) control the operation of the subscriber unit by voice commands. Alternately, voice commands may be used in conjunction with manually entered commands (or vice versa) to execute a desired function. Whenever another individual desires to use that subscriber unit (for example, at a change in a working shift), the codebook card may be readily removed and replaced with the codebook card of the new subscriber.

Figure 3:
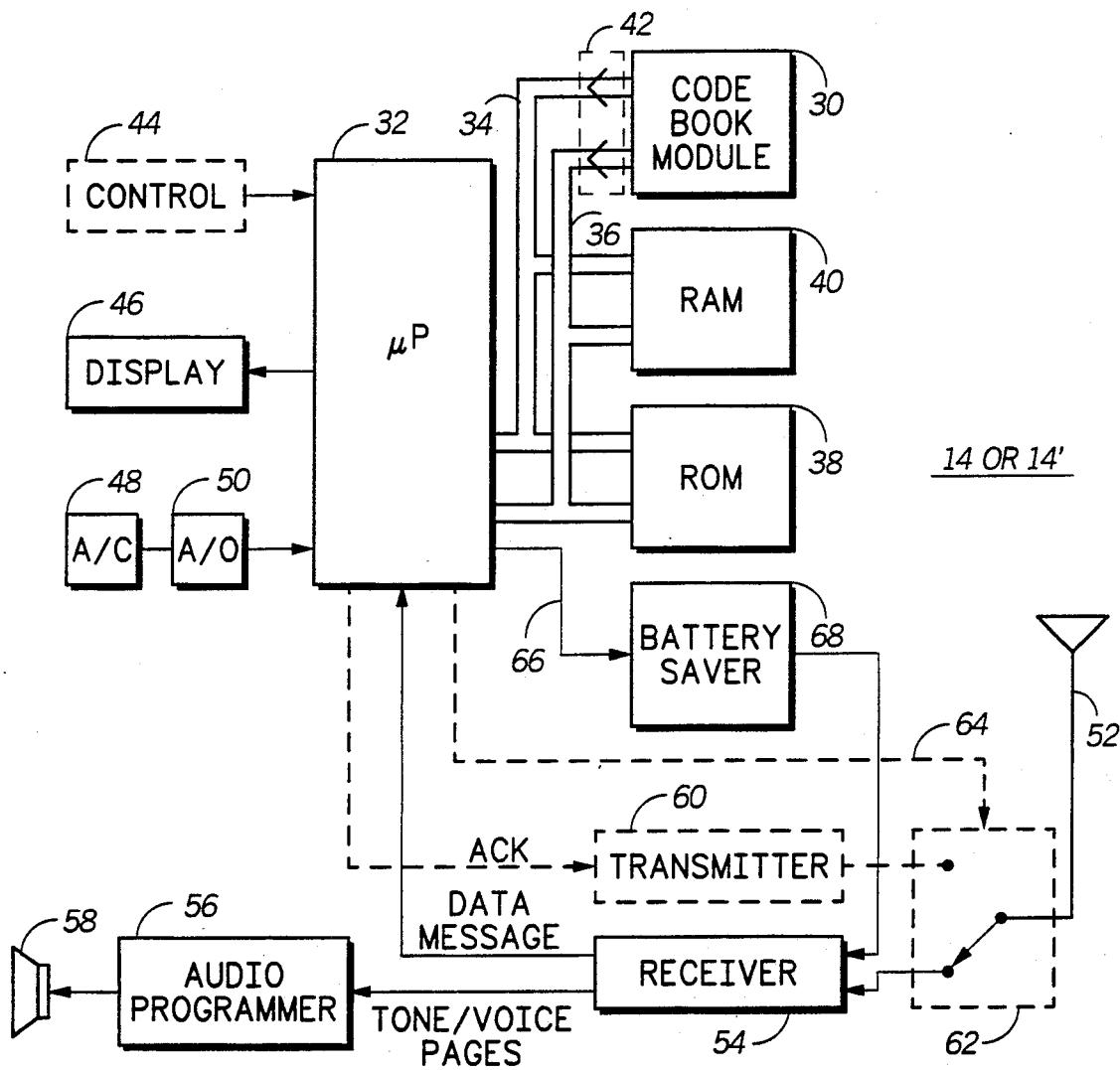
FIG. 3 is a block diagram the pager of FIG. 1 or FIG. 2.

Referring now to FIG. 3, there is shown a block diagram of a pager (14 or 14'). The pager operates under the control of a microprocessor (32), which communicates via an address bus (34) and a data but (36) with read-only memory (ROM) (38) and random access memory (RAM) (40). The codebook for each individual resides in a memory means (preferably electronically erasable programmable read-only memory (EEPROM)) within the codebook module (30). In the first embodiment of the present invention, the EEPROM is preferably resident within the pager (14). In the second embodiment, the codebook module (30) preferably is constructed and arranged to be removably coupled (42) to the address bus (34) and the data bus (36) via any suitable connector or coupler. Also, in another aspect of the second embodiment of the invention, the microprocessor (32) operates to sense the presence of the codebook card (30), after which the microprocessor may permit the pager (14') to operate.

Preferably, the pager (14) is entirely controlled by voice commands received via the microphone (48) and digitized (50) prior to being processed by the microprocessor (32). Optionally, the subscriber may enter manual commands via control keys (buttons or switches) (44). If voice commands are used to only partially control the pager (14), manually entered (44) commands may be used in conjunction with one or more voice commands to provide full control of the pager.

The pager subscriber (14) receives data or voice messages via an antenna (52) and a receiver (54), which forwards data messages to the microprocessor (32) for processing, storage, and routing to the display (46), while routing alert tones and voice messages to any suitable audio processing stages (56), which may provide the tones and voice messages to the subscriber via the speaker (58). It will be understood by those skilled in the art that the RAM (40) includes a plurality of storage areas to store any data messages. As will be appreciated, the data messages may be retrieved, deleted, protected, or processed by the subscriber by speaking an appropriate voice command. The microprocessor (32) also controls (66) a battery saver circuit (68), which controls (70) switching on and off the receiver (54) thereby extending the life of the power supply (battery) of the pager.

Optionally, the paging subscriber may include a transmitter (60), which may transmit acknowledge messages from the paging subscriber (14) to a paging transmitter. Of course, if the pager (14) contains the optional transmitter (60), an antenna switch (62) and its associated antenna control line (64) would be required.

According to the invention, a significant level of voice control, may be accomplished by a limited word set. While total voice control may require several additional words, the present invention contemplates that the pager (14 or 14') may be at least partially controlled by the word set represented in Table 1 below.

TABLE 1
| LIGHT/LAMP |
| --- |
| ON |
| OFF |
| PAGER |
| CANCEL |
| DISPLAY |
| ACKNOWLEDGE |
| MESSAGE |
| NUMBER |
| RESET |
| STEP |
| ALERT |
| SILENT |
| DELETE |
| HOLD |
| VOLUME |
| ERASE |
| NEXT |
| PREVIOUS |
| LOCK |
| PRINT |
| READ |
| PROTECT |
| ZERO |
| ONE |
| TWO |
| THREE |
| FOUR |
| FIVE |
| SIX |
| SEVEN |
| EIGHT |
| NINE |

According to the invention, a pager (14) may be fully controlled by voice commands. Voice commands may be used to activate and control advanced paging features without the need for additional manual control means such as switches or buttons. By speaking one or more of the above exemplary list of command words, the present invention envisions several advanced paging features, some of which are set forth in Table 2 below:

TABLE 2
| DISPLAY MESSAGE # |
| --- |
| PROTECT MESSAGE # |
| CANCEL MESSAGE # |
| ACKNOWLEDGE MESSAGE # |
| PRINT MESSAGE # |
| SAVE MESSAGE # |
| PAGER ON/OFF |
| DISPLAY ON/OFF |
| DISPLAY LIGHT ON/OFF |

TABLE 2-continued

VOLUME #
NEXT MESSAGE
PREVIOUS MESSAGE
ERASE MESSAGES
(Where # represents a number)

Some of the functions of these command may be self evident, such as, for example, "Display Message Five" (the pager responding by retrieving message five from a message storage means and displaying the information comprising message five on the display); "Cancel Message Two" (the pager responding by deleting the information comprising message two from the message storage means); or "Next Message" (the pager responding by displaying the next message without regard to which message number it is). Other features are somewhat more subtle, such as, for example, "Volume Three" (the pager responding by increasing or deceasing the volume to level three); "Protect Message Five" (the pager responding by protecting a message from being lost even by an "Erase All Messages" command). Of course, other features may be easily added by simply adding an appropriate command word to the codebook.

What is claimed is

1. A pager being at least partially controlled and operated via voice commands, comprising:
   radio receiving means for receiving voice recognition data for an individual from a repository station having voice recognition information for a plurality of individuals, the voice recognition data representing voice commands required to initiate one or more functions within the pager;
   storage means for storing the voice recognition data;
   audio receiving means for receiving voice signals to provide received voice signals;
   processing means, coupled to said storage means, for processing said received voice signals and at least a portion of the stored voice recognition data to recognize voice commands;
   means responsive to said voice commands for initiating functions within the pager as specified by said voice commands.

2. The pager of claim 1, wherein said processing means further comprises: means for processing manually entered commands in cooperation with said voice commands processed in accordance with said data representing voice recognition information to at least partially control operation of said paging receiver in response to said manually entered commands and said voice commands.

3. The pager of claim 1, wherein said processing means further comprises: means for detecting the absense of voice commands and means for processing, in the absence of voice commands, manually entered commands so as to at least partially control said paging receiver in response to said manually entered commands.

4. The pager of claim 1, which includes transmitter means for transmitting a request to receive from the repository station the voice recognition data for an individual.

5. The pager of claim 4, wherein the transmitter means comprises an acknowledgement means for transmitting an un-solicited acknowledge signal to initiate the transmission of the voice recognition information from the repository station to the pager.

6. The pager of claim 1, which operates in a system having at least one terminal coupled to the repository station for initiating transfer of voice recognition data from the repository station to at least one pager.

7. The pager of claim 1, which operates in a system including means for receiving requests from a telephone network for particular voice recognition information to be transmitted from the repository station to one or more pagers.

8. In a paging system having at least one paging receiver being at least partially controlled by voice commands, and at least one repository station having a data base comprising at least voice recognition information for several individuals, a method for programming at least one paging receiver to recognize said voice commands of a particular individual, comprising the paging receiver steps if:
   (a) receiving a radio frequency communication including data representing voice recognition information for the particular individual from said repository station; and
   (b) processing audio frequency voice commands and at least a portion of said received data representing voice recognition information to at least partially control operation of said paging receiver in response to said voice commands.

9. The method of claim 8, which includes the paging receiver steps of:
   (i) processing, when manually entered commands are not detected, voice commands and at least a portion of said data representing voice recognition information to at least partially control operation of said paging receiver in response to said voice commands;
   (ii) processing, when said manually entered commands are detected, said manually entered commands in cooperation with said voice commands processed processed with said data representing voice recognition information to at least partially control operation of said paging receiver in response to said manually entered commands and said voice commands.

10. The method of claim 8, which includes the paging receiver step of: storing said received data representing voice recognition information in a storage means being coupled to a processing means for processing said voice commands and at least a portion of said data representing voice recognition information to at least partially control operation of said paging receiver in response to said voice commands.

11. The method of claim 8, wherein step (b) further includes the step of printing a paging message in response to a print voice command.

12. The method of claim 8, wherein step (b) further includes the step of displaying a data message received by the paging receiver in response to a display voice command.

13. The method of claim 8, wherein step (b) further includes the step of recalling a data message stored in a second memory means of the paging receiver in response to a recall voice command.

14. The method of claim 8, wherein step (b) further includes the step of deleting a data message stored in a second memory means of the paging receiver in response to a delete voice command.

15. The method of claim 8, wherein step (b) further includes the step of activating the paging receiver in response to a turn on voice command.

16. The method of claim 8, wherein step (b) further includes the step of deactivating the paging receiver in response to an off voice command.

17. The method of claim 8, further including the step of detecting more than one voice command and processing the voice commands for effecting more than one operation in the paging receiver.

18. In a paging system having at least one paging receiver being at least partially controlled by voice commands, and at least one repository station having a data base comprising at least voice recognition information for at least one paging receiver, a method for programming at least one paging receiver to recognize said voice commands, comprising the steps of:

at the repository station:
- (a) receiving a request for voice recognition information for one of several individuals for which voice recognition information is stored at the repository station;
- (b) extracting that portion of a data base of voice recognition information designated for a particular individual;
- (c) transmitting the voice recognition information for the particular individual to at least one paging receiver;

at the paging receiver:
- (a) receiving data representing voice recognition information for the particular individual from said repository station;
- (b) storing at least a portion of said data representing voice recognition information to provide stored voice recognition information;
- (c) comparing voice signals and at least a portion of the stored voice recognition information to recognize voice commands;
- (d) processing the voice commands to at least partially control operation of said paging receiver in response to said voice commands.

19. The method of claim 18, wherein said paging receiver processing step comprises:
- (i) processing, when manually entered commands are not detected, the voice commands to at least partially control operation of said paging receiver in response to said voice commands;
- (ii) processing, when said manually entered commands are detected, said manually entered commands in cooperation with said voice commands processed to at least partially control operation of said paging receiver in response to said manually entered commands and said voice commands.

20. The method of claim 18, wherein the repository station receiving step comprises receiving an acknowledge signal representing a request for voice recognition information for one of several individuals for which voice recognition information is stored at the repository station.

21. The method of claim 18, wherein the repository station receiving step comprises receiving a signal from a telephone network representing a request for voice recognition information for one of several individuals for which voice recognition information is stored at the repository station.

22. The method of claim 18, wherein the repository station receiving step comprises receiving a signal from a terminal representing a request for voice recognition information for one of several individuals for which voice recognition information is stored at the repository station.

23. A paging communication system comprising: at least one repository station, comprising:
- (a) a data base of voice recognition data for several individuals;
- (b) radio transmitting means for transmitting the voice recognition data for particular individuals to at least one pager;
  - (a) audio receiver means for receiving audible voice signals generated externally from said pager;
  - (b) radio receiver means for receiving the voice recognition data from the repository station;
  - (c) memory means for storing the voice recognition data received from the repository station;
  - (d) means for processing received voice signals and at least a portion of the voice recognition data stored in the memory means to recognize voice commands; and
  - (e) means for processing the voice command to at least partially control operation of the pager.

24. The pager of claim 23, wherein said memory means stores voice recognition data for a single individual.

25. The pager of claim 23, wherein said memory means stores voice recognition data for a group of individuals.

26. The pager of claim 23, wherein said receiving means comprises a microphone.

27. A paging communication system comprising: at least one repository station, comprising:
- (a) a data base of voice recognition data for a plurality of individuals;
- (b) telephone interface means for receiving telephone type communications identifying at least one of a plurality of individuals for which voice recognition data resides in the data base;
- (c) radio transmitting means for transmitting the voice recognition data for the identified individuals to at least one pager;

at least one pager, comprising:
- (a) audio receiver means for receiving audible voice signals generated externally from said pager;
- (b) radio receiver means for receiving the voice recognition data from the repository station;
- (c) memory means for storing the voice recognition data received from the repository station;
- (d) means for processing received voice signals and at least a portion of the voice recognition data stored in the memory means to recognize voice commands; and
- (e) means for processing the voice command to at least partially control operation of the pager.

28. A paging communication method comprising the steps of:

at least one repository station:
- (a) receiving telephone type communications identifying at least one of a plurality of individuals for which voice recognition data resides in a data base containing at least voice recognition data for a plurality of individuals;
- (b) transmitting the voice recognition data for the identified individuals to at least one pager;

at least one pager;
- (a) receiving the voice recognition data from the repository station;
- (b) storing the voice recognition data received from the repository station;

(c) receiving audible voice signals generated external from said pager;
(d) processing the received voice signals and at least a portion of the voice recognition data stored in the memory means to recognize voice commands; and
(e) processing the voice commands to at least partially control operation of the pager.

* * * * *